(12) United States Patent  (10) Patent No.: US 7,845,143 B2
Katakura et al.  (45) Date of Patent: Dec. 7, 2010

(54) MOLDING-FURNISHED GLASS

(75) Inventors: Seiji Katakura, Tokyo (JP); Nobuyuki Inami, Saitama (JP)

(73) Assignees: Nippon Steel Glass Company, Limited, Tokyo (JP); Honda Motor Co., Ltd., Tokyo (JP)

( * ) Notice: Subject to any disclaimer, the term of this patent is extended or adjusted under 35 U.S.C. 154(b) by 1071 days.

(21) Appl. No.: 11/591,351

(22) Filed: Nov. 1, 2006

(65) Prior Publication Data
US 2007/0094997 A1 May 3, 2007

(30) Foreign Application Priority Data
Nov. 1, 2005 (JP) .............................. 2005-318611

(51) Int. Cl.
E04C 2/54 (2006.01)
(52) U.S. Cl. ..................... 52/787.12; 52/208; 52/800.1; 52/716.6
(58) Field of Classification Search ............... 52/800.1, 52/787.12, 716.5, 716.6, 716.7, 208, 717.05, 52/716.2; 296/93, 146.15, 1.08, 201
See application file for complete search history.

(56) References Cited

U.S. PATENT DOCUMENTS

| | | | |
|---|---|---|---|
| 3,720,030 A | 3/1973 | Krodel | |
| 4,072,340 A * | 2/1978 | Morgan | 296/201 |
| 4,719,736 A * | 1/1988 | Aho et al. | 52/204.591 |
| 4,723,809 A * | 2/1988 | Kida et al. | 296/96.21 |
| 5,027,569 A * | 7/1991 | Keys | 52/208 |
| 5,142,834 A * | 9/1992 | Laclave et al. | 52/208 |
| 5,199,761 A | 4/1993 | Dannecker et al. | |
| 5,353,571 A * | 10/1994 | Berdan et al. | 52/716.5 |
| 5,448,804 A * | 9/1995 | Warren | 24/297 |
| 6,151,834 A * | 11/2000 | Oami et al. | 49/402 |
| 6,263,627 B1 * | 7/2001 | Schonenbach et al. | 52/208 |
| 6,318,045 B1 * | 11/2001 | Kress | 52/716.6 |
| 6,510,662 B2 * | 1/2003 | Ichimaru | 52/204.7 |
| 6,546,683 B1 | 4/2003 | Senge | |
| 6,976,816 B2 * | 12/2005 | Slesinski et al. | 411/122 |
| 7,210,884 B2 * | 5/2007 | Shindoh | 411/82.5 |
| 2004/0117951 A1 | 6/2004 | Nishimura et al. | |

FOREIGN PATENT DOCUMENTS

| | | |
|---|---|---|
| DE | 41 06 715 A1 | 9/1992 |
| DE | 42 17 513 A1 | 12/1992 |
| DE | 10 2005 054 721 A1 | 5/2007 |
| EP | 1 033 273 A2 | 9/2000 |
| EP | 1 433 631 A1 | 6/2004 |
| JP | 2003-025837 | 1/2003 |
| WO | WO 2007/057118 A1 | 5/2007 |

OTHER PUBLICATIONS

European Search Report of EP 06 02 2766, dated May 13, 2008.

* cited by examiner

*Primary Examiner*—Richard E Chilcot, Jr.
*Assistant Examiner*—Branon C Painter
(74) *Attorney, Agent, or Firm*—Hamre, Schumann, Mueller & Larson, P.C.

(57) ABSTRACT

A molding-furnished glass in which a resin molding is integrally provided to the edge portion of a glass base. A metal molding is attached to the resin molding by connecting the metal molding to the resin molding through the use of a slide piece and a fastener.

5 Claims, 8 Drawing Sheets

MOLDING-FURNISHED GLASS

FIELD OF THE INVENTION

The present invention relates to a molding-furnished glass in which a resin molding is integrally provided to the periphery of a glass base, and a metal molding is provided to the resin molding.

BACKGROUND OF THE INVENTION

Molding-furnished glass in which a resin molding is integrated with the edge portion of a glass base is widely used in automobile window glass. Metal/resin-molding-furnished glass in which a metal molding is fixed to a resin molding to enhance decorative properties is also in use. A method for manufacturing this metal/resin-molding-furnished glass is disclosed in Japanese Patent Laid-Open Publication No. 2003-25837 (JP-A-2003-25837), for example.

A method for manufacturing a metal/resin-molding-furnished glass will be described hereinafter based on FIGS. 9 through 11 hereof.

In FIG. 9, a metal molding 102 is positioned in a lower die 101, and a glass base 103 is also placed on the lower die 101. An upper die 104 is then placed over the lower die 101. The metal molding 102 is pressed against protrusions 106, 106 on the lower die by evacuating a suction tube 105. A molten resin is then injected into a cavity 107.

In FIG. 10, the suction tube 105 is brought to atmospheric pressure when the molten resin 108 has solidified. The upper die 104 is then separated from the lower die 101.

The finished molding-furnished glass 110 is composed of the glass base 103, a resin molding 111 that is integrally formed on the glass base 103, and a metal molding 102 that is affixed to the resin molding 111, as shown in FIG. 11. Specifically, the resin molding 111 joins the metal molding 102 to the glass base 103.

However, this conventional technique has the following drawbacks.

Firstly, gaps form between the metal molding 102 and the protrusions 106, as shown in FIG. 9. When these gaps occur, the molten resin that flows in the gaps wraps around the face of the metal molding 102. This resin that hangs over the metal molding 102 detracts from the appearance of the metal molding 102. When the suction force of the suction tube 105 is increased in order to prevent the gaps from forming, drawbacks occur whereby the metal molding 102 changes shape, or stress fractures occur in the metal molding 102.

Secondly, there is a risk of abrasion marks occurring in the metal molding 102 during manufacturing, transport, or use. The molding-furnished glass 110 as a unit must be discarded when abrasion marks occur on the metal molding 102. This is because the integrated structure makes it impossible to replace only the metal molding 102. Abrasion marks easily occur due to carelessness during manufacturing, contact during use, or other causes. It is undesirable in terms of utilization of raw materials to also discard non-defective glass bases 103 and resin moldings 111.

There is therefore a need for a molding-furnished glass whereby it is possible to easily replace only the metal molding.

SUMMARY OF THE INVENTION

According to the present invention, there is provided a molding-furnished glass which comprises a glass base, a resin molding formed integrally with an edge portion of the glass base and having a fastener hole, a metal molding C-shaped in cross-section, a slide piece movably fitted in a groove of the metal molding, a fastener inserted through the fastener hole threadedly into the slide piece for fastening the metal molding to the resin molding.

Since the metal molding is attached to the resin molding by a fastener, the metal molding can be replaced merely by removing the fastener. A slide piece that functions as a nut is also enabled to travel. Since the slide piece can travel, the slide piece can easily be positioned so as to coincide with the fastener hole that is formed in the resin molding. The fastener can easily be threaded into the slide piece when the slide piece is aligned with the position of the fastener hole. The metal molding can be assembled efficiently, and the ability to produce a molding-furnished glass can be enhanced.

Preferably, the slide piece includes a spring portion for pressing against a wall of the groove. Specifically, there is no risk of the slide piece moving during transport of the metal molding. As a result, the position of the slide piece needs little correction, and the ability to produce the molding-furnished glass can be enhanced.

Desirably, the glass further comprises an irregular-shaped washer having a shape obtained by combining half of a round washer with half of a horizontally elongated rectangular washer and placed over the fastener hole, the fastener being installed via the irregular-shaped washer.

The washer is used in a state in which the washer is fitted in a concave portion provided to the resin molding. This concave portion is formed in a resin molding stage by providing a convex portion to the die.

The shape of the convex portion provided to the die may be that of a semicircular column combined with a horizontally elongated rectangular column.

When the shape is that of a semicircular column, the resin can be caused to flow in the resin molding stage. When the washer is fitted in the concave portion of the resin molding, surface area can be added by the horizontally elongated rectangular washer, and the washer can therefore be prevented from sinking into the resin molding. Specifically, the flow of resin during the resin molding stage can be ensured while the washer is prevented from sinking into the resin molding.

Preferably, the fastener comprises a fastener head, a neck extending from the fastener head, and a screw extending from the neck, while the neck has an outside diameter set to be larger than a maximum diameter of the screw. The large-diameter neck approaches the slide piece as the screw is threaded into the slide piece. The screw stops advancing when the distal end of the neck comes into contact with the slide piece. Specifically, the distal end of the neck can act as a stopper for preventing over-tightening of the fastener.

Desirably, the fastener comprises a fastener head, a neck extending from the fastener head, a washer fitted on the neck, protrusions protruding outward in a radial direction at a distal end of the neck on which the washer is fitted, for preventing the washer from separating, and a screw extending from the neck, and the neck has an outside diameter set to be larger than a maximum diameter of the screw.

The washer serves to prevent the head of the fastener from sinking into the resin molding. By ensuring that this type of washer does not separate from the neck, loss of the washer and failure to install the washer can be prevented. The protrusions formed at the distal end of the neck are also embedded and driven into the resin molding.

BRIEF DESCRIPTION OF THE DRAWINGS

A preferred embodiment of the present invention will be described in detail below, by way of example only, with reference to the accompanying drawings, wherein:

FIG. 8A is a view as seen from arrow 8 of FIG. 5, while

DESCRIPTION OF THE PREFERRED EMBODIMENT

Figure 1:
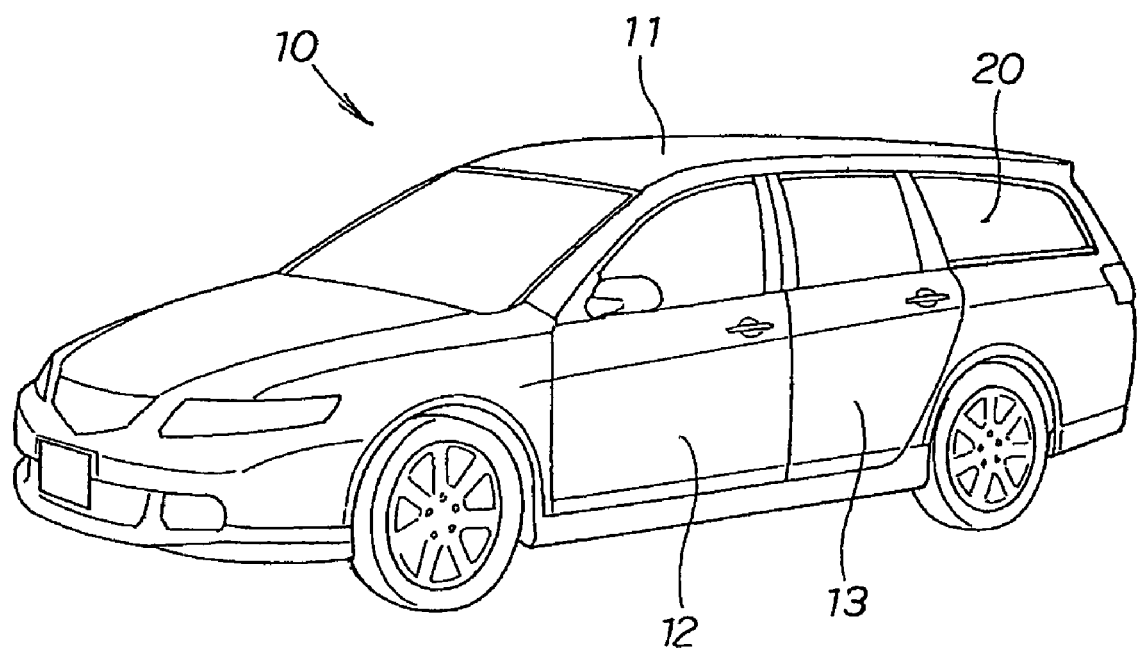
FIG. 1 is a perspective view of a vehicle.

As shown in FIG. 1, a front door 12 and a rear door 13 are provided to the body 11 of a vehicle 10, and a molding-furnished glass 20 is installed to the rear of the rear door 13. This molding-furnished glass 20 will be described in detail hereinafter.

Figure 2:
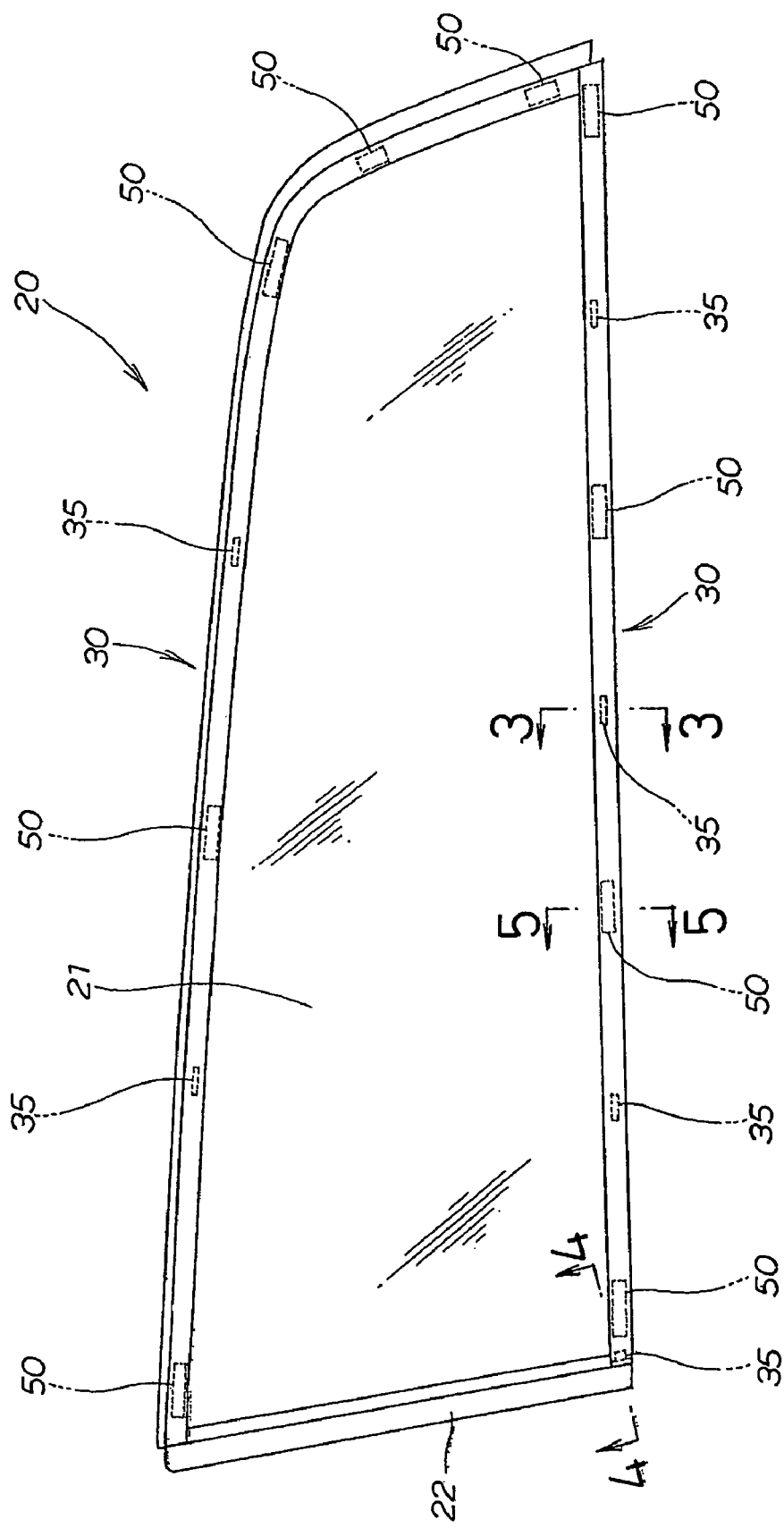
FIG. 2 is a front elevational view of the molding-furnished glass of the present invention.

As shown in FIG. 2, the molding-furnished glass 20 is composed of a glass base 21 having a horizontally elongated rectangular shape, a weather strip 22 affixed on the left edge of the glass base 21 in the drawing, and moldings 30, 30 that are integrally formed at the top, right, and bottom edges of the glass base 21 in the drawing.

Figure 3:
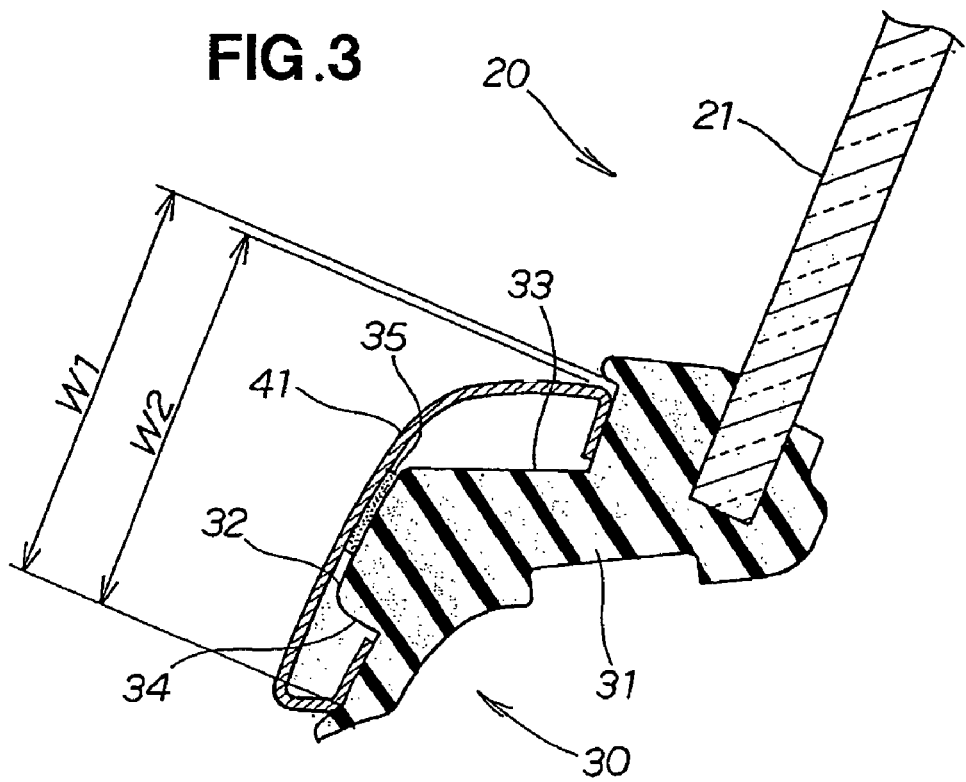
FIG. 3 is a sectional view taken along line 3-3 of FIG. 2.

As shown in FIG. 3, which is a sectional view along line 3-3 in FIG. 2, a resin molding 31 is integrally formed with the glass base 21 by an injection molding method. A metal molding 41 having a C-shaped cross-section is added to the resin molding 31. Specifically, the molding 30 is composed of the resin molding 31 and the metal molding 41.

When the surface of the resin molding 31 on the left side in the drawing is the front surface, and the surface on the right side in the drawing is the rear surface, an apex 32 is provided to the center of the front surface of the resin molding 31, an upper groove 33 is provided to the upper portion of the front surface, and a lower groove 34 is provided to the lower portion of the front surface. The apex 32 is flat, and the metal molding 41 is bonded thereto by double-sided tape 35 or an equivalent adhesive agent or adhesive member. The double-sided tape 35 or equivalent adhesive agent or adhesive member used herein may have a mild adhesive strength that allows the metal molding 41 to be peeled from the resin molding 31 when necessary.

The apparent maximum width of the upper groove indicated by the reference symbol W1 in the drawing is about 0.5 mm larger than the width W2 of the metal molding 41. Since W1>W2, when the accumulated error is less than 0.5 mm, the metal molding 41 can be properly placed in the upper groove 33 and the lower groove 34 even when flexure or manufacturing errors occur in the metal molding 41.

The metal molding 41 is a long material molded into a C-shaped cross-section obtained by plastic-working a thin stainless steel panel or a thin panel of another metal. The term "C-shaped cross-section" is used for convenience herein, and besides a simple C-shaped cross-section, this term also includes a shape in which a portion is removed from an arcuate cross-section, a shape in which a portion is removed from a diamond-shaped cross-section, or a more complex cross-sectional shape. In short, any shape obtained by removing a portion from a closed cross-sectional structure may be used.

Figure 4:
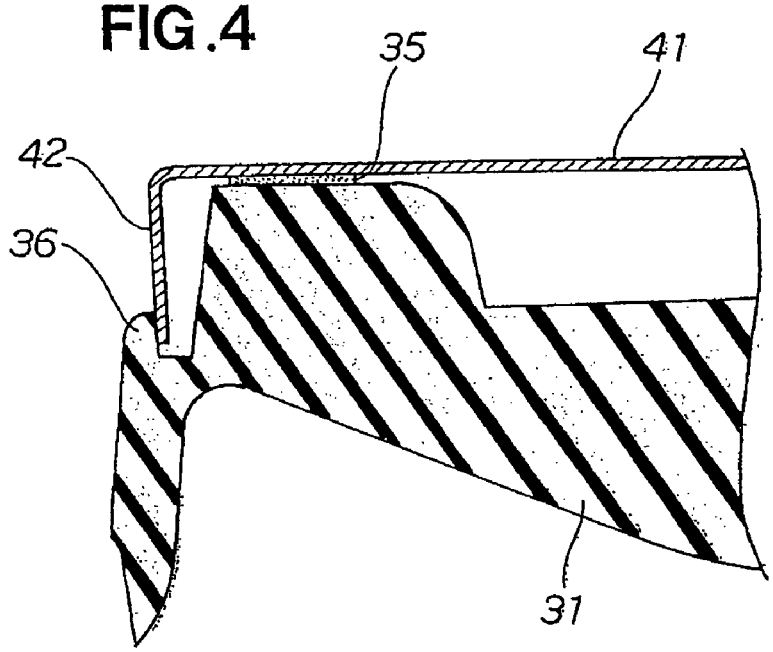
FIG. 4 is a sectional view taken along line 4-4 of FIG. 2.

FIG. 4 is a sectional view along line 4-4 in FIG. 2, and shows an end of the metal molding 41. Specifically, one end of the metal molding 41 is formed into a cover portion 42 by bending the end 90° in the counterclockwise direction of the drawing by a plastic working process. A wall portion 36 that corresponds to the cover portion 42 extends upward from the resin molding 31, and the cover portion 42 is superposed on the wall portion 36. As a result, the sealing properties are maintained and the external appearance is enhanced at the end of the metal molding 41.

Figure 5:
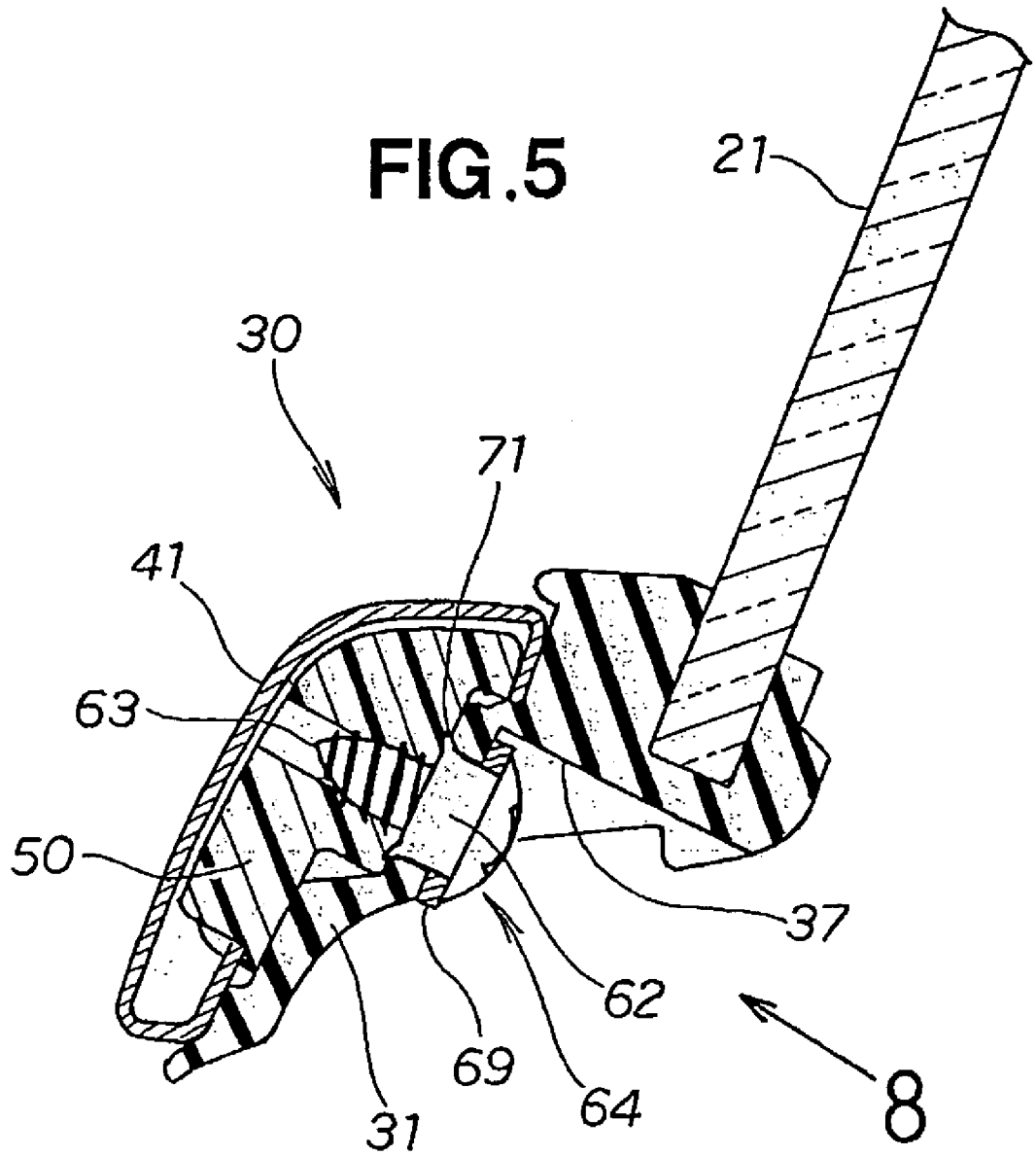
FIG. 5 is a sectional view taken along line 5-5 of FIG. 2.
Figure 6:
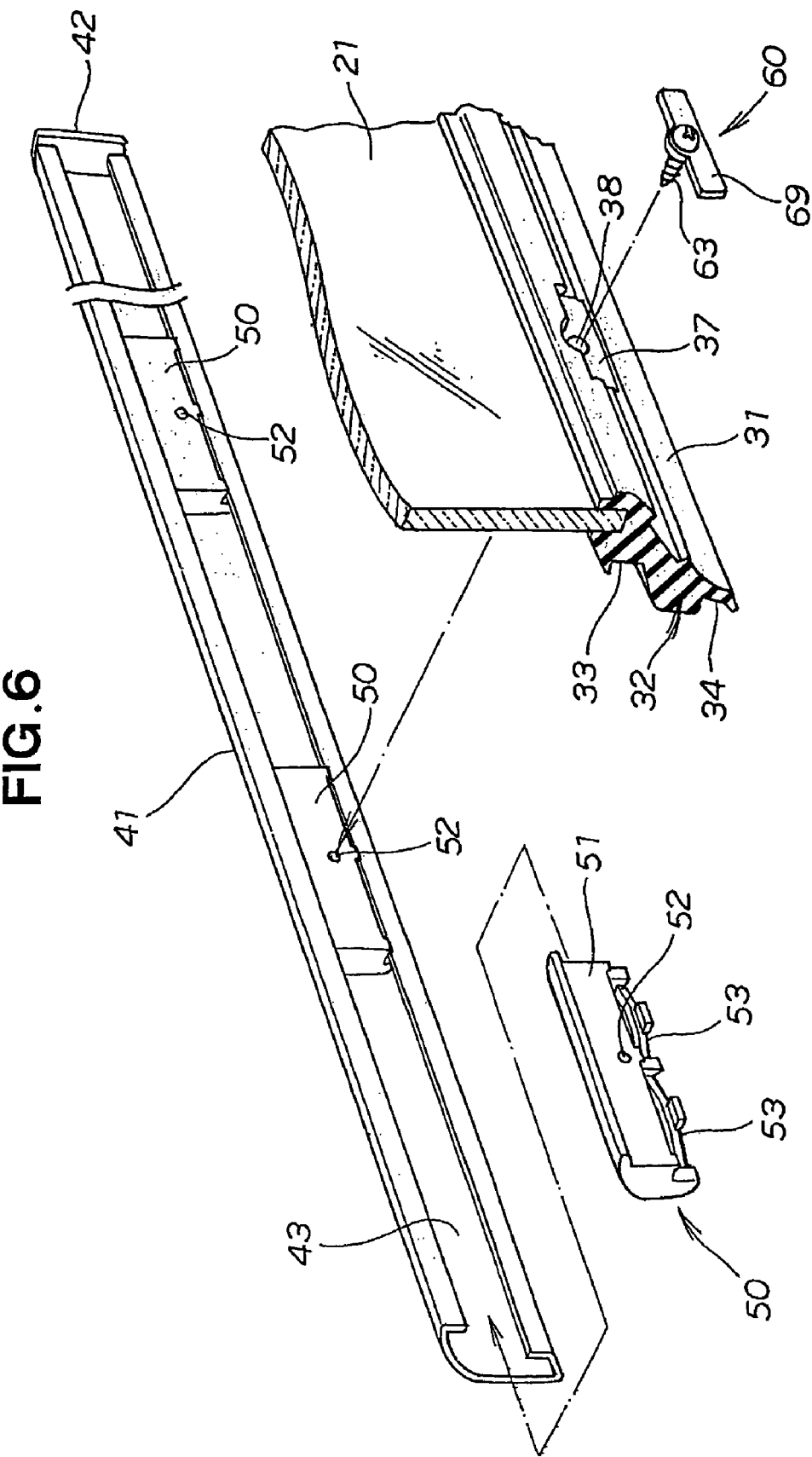
FIG. 6 is an exploded perspective view of FIG. 5.

A cross-sectional view along line 5-5 of FIG. 2 is shown in FIG. 5, and an exploded view of FIG. 5 is shown in FIG. 6. Specifically, as shown in FIG. 6, a concave portion 37 that corresponds to a washer-furnished fastener 60 is formed on the rear surface of the resin molding 31 by an injection molding process. A fastener hole 38 is provided to the bottom of the concave portion 37. This fastener hole 38 may be formed during injection molding or after injection molding.

A plurality of slide pieces 50 are fitted in a groove 43 of the metal molding 41. The slide pieces 50 are resin molded articles composed of a rectangular-prism-shaped piece body 51, a lower hole 52 formed in the center of the piece body 51, and spring portions 53, 53 that are integrally formed in the lower portion of the piece body 51.

The lower hole 52 is used when the screw 63 of the washer-furnished fastener 50 is a tapping screw (a screw that is capable of thread cutting), and is a hole whose diameter is smaller than the outside diameter of the screw 63. Besides a tapping screw, the screw 63 may also be a tapered screw or a straight screw. In this case, the lower hole 52 is preferably changed to a female-threaded portion.

The spring portions 53 are members for pressing against the wall (inner wall surface) of the groove 43 of the metal molding 41. Since the spring portions 53 are provided, there is no risk of the slide pieces 50 easily moving along the groove 43. Specifically, there is no risk of the slide pieces 50 becoming misaligned merely as a result of transporting the metal molding 41.

A preferred embodiment of a fastener will next be described based on FIGS. 7A through 7C.

Figure 7A:
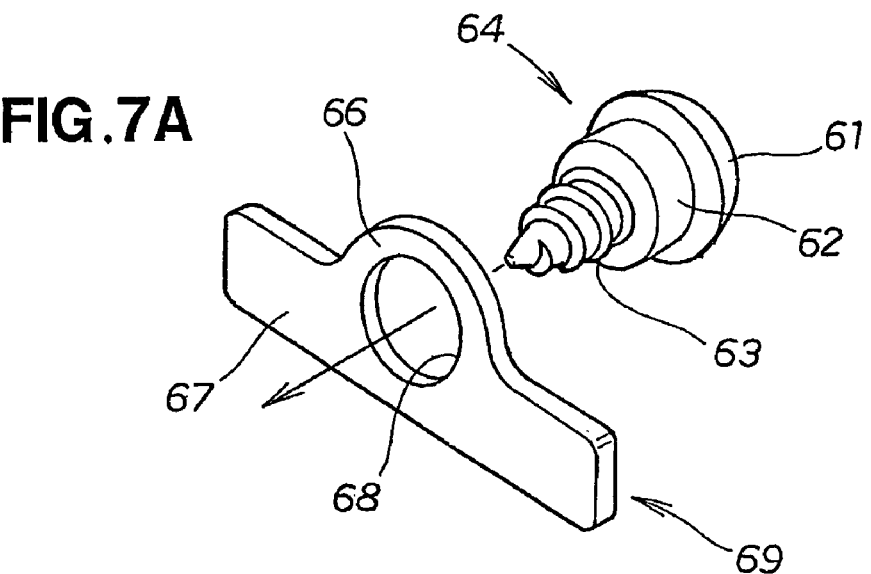
FIGS. 7A through 7C are views showing the structure of the washer-furnished fastener.

As shown in FIG. 7A, a necked fastener 64 is provided that is composed of a fastener head 61, a neck 62 that extends from the fastener head 61, and a screw 63 that extends from the neck 62. An irregular-shaped washer 69 composed of a horizontal rectangular portion 67 and a portion having a shape obtained by combining half of a horizontally elongated rectangular washer with half of a circular washer, i.e., a semicircular portion 66, is also provided.

The screw 63 is preferably a tapping screw. The fastener as typified by the necked fastener 64 is not narrowly defined, and indicates a fastening member that may be a small screw or a small-diameter bolt.

The neck 62 is a cylindrical portion that has a diameter that is sufficiently larger than the maximum diameter of the screw 63.

The irregular-shaped washer 69 is guided onto the necked fastener 64 by the passage of the neck 62 through the hole 68.

Figure 7B:
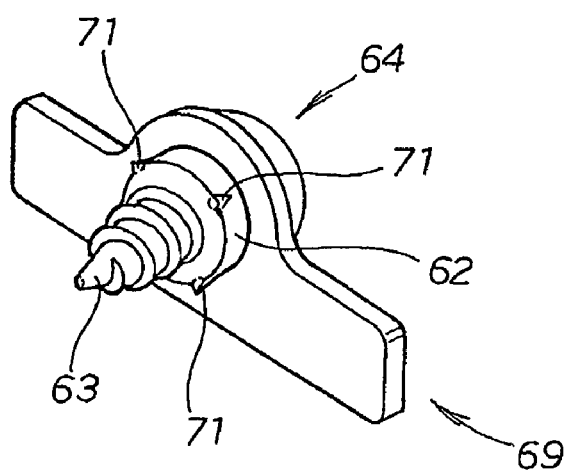

As shown in FIG. 7B, protrusions 71 that extend outward in the radial direction are provided to the distal end of the neck 62 by a clinching method (for example, striking with a blade from the direction of the screw 63).

Figure 7C:
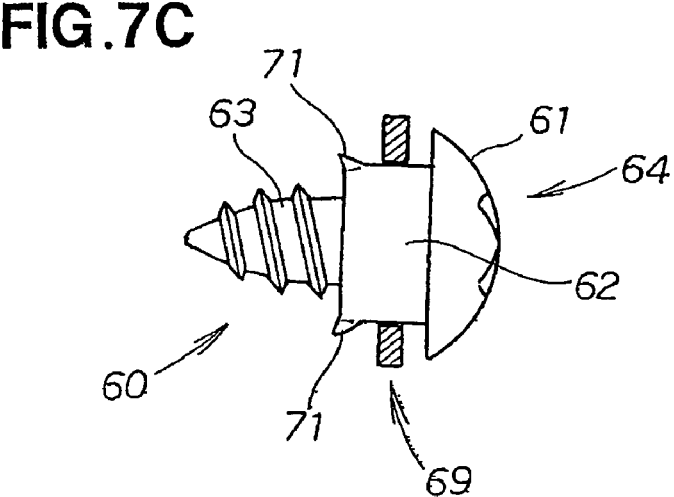

As shown in FIG. 7C, the washer-furnished screw 60 is composed of the necked fastener 64, the irregular-shaped washer 69, and the clinched protrusions 71, and the protrusions 71 act as a stopper. There is therefore no risk of the irregular-shaped washer 69 separating from the neck 62 thereafter.

Since the irregular-shaped washer 69 does not separate from the neck 62, loss of the irregular-shaped washer 69 can be prevented, and there is no risk of failure to install the irregular-shaped washer 69 on the necked fastener 64.

As shown in FIG. 5, the large-diameter neck 62 approaches the slide piece 50 as the screw 63 is driven into the slide piece 50. The screw 63 stops and moves no further when the distal end of the neck 62 comes into contact with the slide piece 50. Specifically, the distal end of the neck 62 acts as a stopper, and over-tightening of the screw 63 can be prevented. Furthermore, the protrusions 71 formed at the distal end of the neck 62 are embedded and driven into the resin molding 31. As a result, the necked fastener 64 can be locked in position.

Figure 8A:
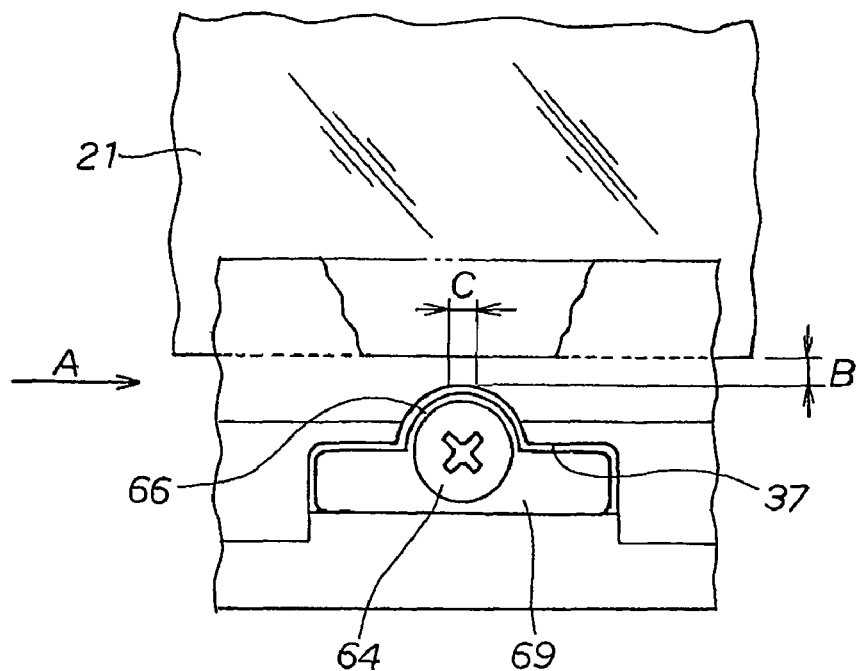

As shown in FIG. 8A, which is a perspective view from the arrow 8 in FIG. 5, the position of the concave portion 37 is set so that the semicircular portion 66 of the irregular-shaped washer 69 approaches the glass base 21. The concave portion 37 is formed by a convex portion that is provided to the resin molding die. There is a risk of the flow of the resin being obstructed by the convex portion provided to the die.

For example, assuming that the molten resin flows from left to right as indicated by the arrow A in the drawing during injection molding, the shortest distance B between the lower edge of the glass base 21 and the concave portion 37 is the dimension of the narrowest portion. The length (length in the direction of the arrow A) C of the narrowest portion is extremely small. Since the flow resistance of the resin is proportional to the product of the cross-sectional area and the length, the resistance value in the present embodiment can be described as being proportional to (B×C).

Figure 8B:
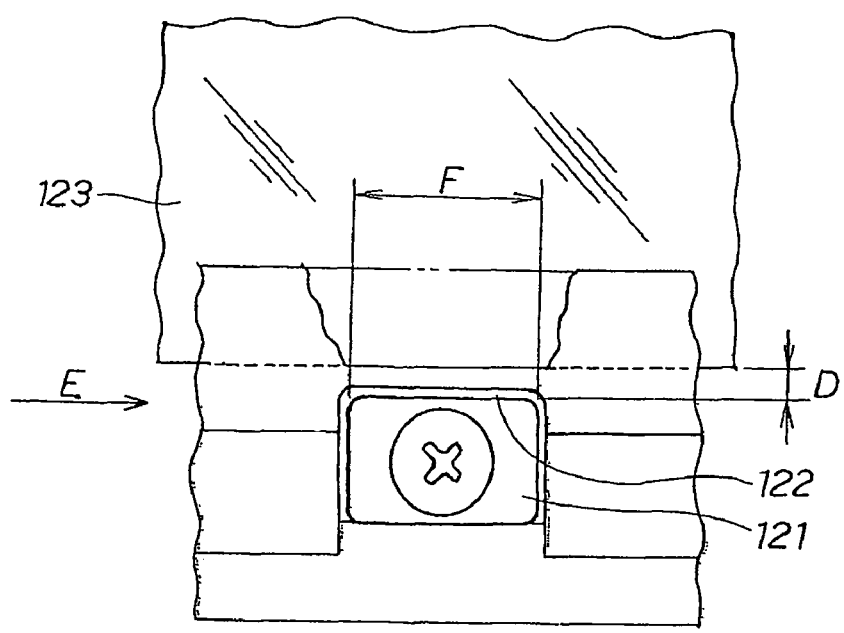
FIG. 8B is a comparison view.
Figure 9:
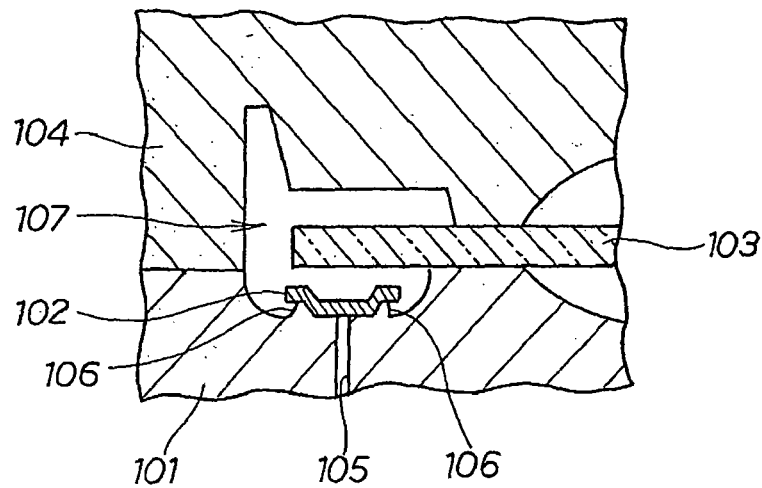
FIG. 9 is a view showing a method for manufacturing the conventional metal/resin molding-furnished glass.
Figure 10:
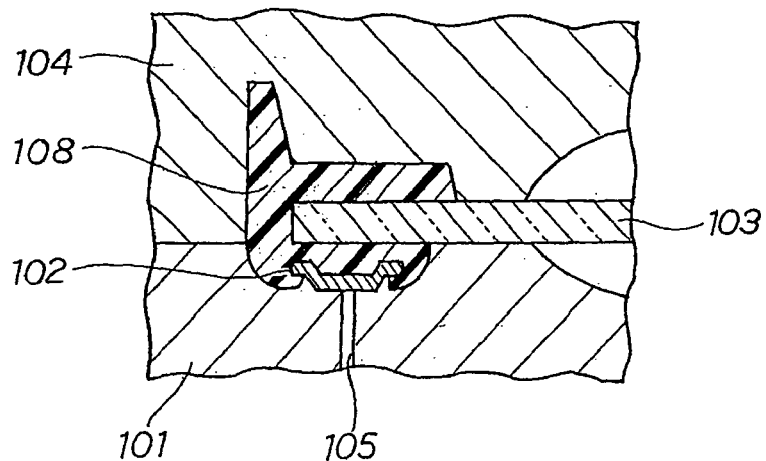
FIG. 10 is a separate view showing the conventional metal/resin molding-furnished glass manufacturing method.
Figure 11:
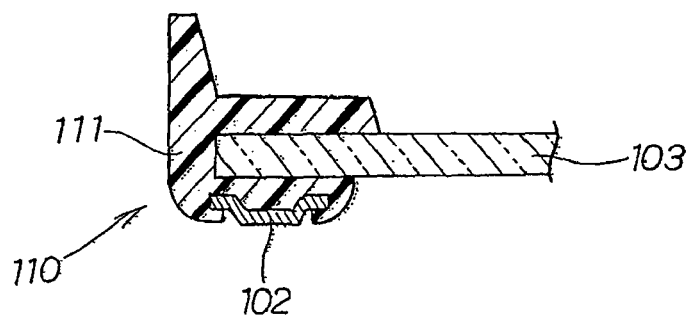
FIG. 11 is a sectional view showing a conventional molding-furnished glass.

In FIG. 8B, which shows an example for comparison with FIG. 8A, a horizontally elongated rectangular washer 121 is used. The distance D between the upper edge of a rectangular concave portion 122 for accommodating the rectangular washer 121 and the lower edge of the glass base 123 is the dimension of the narrowest portion. The length (length in the direction of the arrow E) F of this narrowest portion is large.

Since the flow resistance of the resin is proportional to the product of the cross-sectional area and the length, the resistance value in the comparative example can be described as being proportional to (D×F). The distance D herein is equal to the distance B shown in FIG. 8A. The resistance value in the comparative example can therefore be rewritten as (B×F).

Since C<F, and (Resistance Value of Embodiment)/(Resistance Value of Comparative Example)=(B×C)/(B×F)=C/F, it is apparent that the resistance value in the embodiment is markedly smaller than the resistance value of the comparative example.

Therefore, the flow of the resin can be improved in the embodiment, and defects can be prevented from occurring during resin molding.

In FIG. 2, double-sided tape 35 or another adhesive agent or adhesive member is placed in the center position between a slide piece 50 and a slide piece 50. The double-sided tape 35 serves to affix the metal molding 41 to the resin molding 31, as shown in FIG. 3.

When the metal molding 41 is insufficiently supported, a chattering sound (sound that occurs when the glass vibrates at high pitch) can occur during travel.

In the present embodiment, by providing the double-sided tape 35 midway between the slide piece 50 and the slide piece 50, the metal molding 41 can be adequately supported, and chattering sounds can be prevented from occurring.

Placing the double-sided tape 35 between the slide piece 50 and the slide piece 50 also makes it possible to enlarge the space between the slide piece 50 and the slide piece 50, i.e., the pitch of the slide pieces 50, and to reduce the number of slide pieces 50.

In FIG. 6, the position of the slide piece 50 in the groove 43 of the metal molding 41 can easily be changed, and the following effects can therefore be demonstrated.

A case is assumed in which lower holes 52 are formed directly in the metal molding 41 without using the slide piece 50. The positioning (pitch) of the directly formed lower holes 52 can become inaccurate due to machining error and the like. When a screw 63 is applied without consideration for this error, a load is placed on the softer resin molding 31. Specifically, the fastener hole 38 is unnecessarily elongated, the concave portion 37 is deformed, and the irregular-shaped washer 69 can sometimes separate from the concave portion 37. This results in damage to the resin molding 31.

In this regard, since the slide piece 50 can be moved in the present invention, the slide piece 50 can be moved so that the center of the lower hole 52 coincides with the center of the fastener hole 38, and there is no longer a risk of damaging the resin molding 31.

When the pitch of the slide pieces 50 must be changed due to changes in machine type, design, or the like, it is easy to adapt to a need for changing the pitch since the slide pieces 50 in the present invention can move.

The molding-furnished glass of the present invention was applied herein to the (so-called) quarter glass of a vehicle in the embodiments, but it is apparent that the present invention may also be applied to other types of glass in a vehicle, or in applications other than vehicle use.

The slide piece may also be a slide piece that does not have a spring portion, and the fastener may be a common fastener that does not have a neck.

The peripheral edge portion of the glass base is not limited to the entire periphery of the glass base, and may be a portion of the entire periphery.

Obviously, various minor changes and modifications of the present invention are possible in light of the above teaching. It is therefore to be understood that within the scope of the appended claims the invention may be practiced otherwise than as specifically described.

What is claimed is:

1. A molding-furnished glass, comprising:
   a glass base;
   a resin molding formed integrally with an edge portion of the glass base and having a fastener hole;
   a metal molding C-shaped in cross-section;
   a slide piece movably fitted in a groove of the metal molding; and
   a fastener inserted through the fastener hole threadedly into the slide piece for fastening the metal molding to the resin molding, wherein the fastener includes a fastener head,
the slide piece being disposed between the metal molding and the fastener head.

2. The glass of claim 1, wherein the slide piece comprises a spring portion for pressing against a wall of the groove.

3. The glass of claim 1, further comprising an irregular-shaped washer having a shape obtained by combining half of a round washer with half of a horizontally elongated rectangular washer and placed over the fastener hole, the fastener being installed via the irregular-shaped washer.

4. The glass of claim 1, wherein the fastener comprises a neck extending from the fastener head, and a screw extending from the neck, and the neck has an outside diameter set to be larger than a maximum diameter of the screw.

5. The glass of claim 1, wherein the fastener comprises a neck extending from the fastener head, a washer fitted on the neck, protrusions protruding outward in a radial direction at a distal end of the neck on which the washer is fitted, for preventing the washer from separating, and a screw extending from the neck, and the neck has an outside diameter set to be larger than a maximum diameter of the screw.

* * * * *

UNITED STATES PATENT AND TRADEMARK OFFICE
CERTIFICATE OF CORRECTION

| | | |
|---|---|---|
| PATENT NO. | : 7,845,143 B2 | Page 1 of 1 |
| APPLICATION NO. | : 11/591351 | |
| DATED | : December 7, 2010 | |
| INVENTOR(S) | : Katakura et al. | |

It is certified that error appears in the above-identified patent and that said Letters Patent is hereby corrected as shown below:

On the title page, item [73] Assignees: Nippon Steel Glass Company, Limited should be
-- Nippon Sheet Glass Company, Limited, Tokyo (JP);--

Signed and Sealed this
Twelfth Day of April, 2011

David J. Kappos
*Director of the United States Patent and Trademark Office*